US006107222A

United States Patent [19]
Joseph et al.

[11] Patent Number: 6,107,222
[45] Date of Patent: Aug. 22, 2000

[54] REPOSITIONABLE SHEETS WITH A NONWOVEN WEB OF PRESSURE-SENSITIVE ADHESIVE FIBERS

[75] Inventors: Eugene G. Joseph, Arden Hills; Michael D. Crandall, North Oaks, both of Minn.

[73] Assignee: 3M Innovative Properties Company, St. Paul, Minn.

[21] Appl. No.: 08/980,924

[22] Filed: Dec. 1, 1997

[51] Int. Cl.$^7$ .................................................. B32B 29/02
[52] U.S. Cl. ........................ 442/412; 442/394; 428/449; 428/537.7
[58] Field of Search .................................. 442/394, 412; 428/449, 537.7

[56] References Cited

U.S. PATENT DOCUMENTS

| | | | |
|---|---|---|---|
| Re. 24,900 | 12/1960 | Ulrich . | |
| 2,676,182 | 4/1954 | Daudt et al. | 260/448.2 |
| 2,736,721 | 2/1956 | Dexter | 260/42 |
| 2,973,286 | 2/1961 | Ulrich | 117/122 |
| 3,338,992 | 8/1967 | Kinney | 264/24 |
| 3,480,502 | 11/1969 | Schrenk | 156/271 |
| 3,487,505 | 1/1970 | Chisholm et al. | 18/13 |
| 3,502,763 | 3/1970 | Hartmann | 264/210 |
| 3,627,851 | 12/1971 | Brady | 260/825 |
| 3,692,618 | 9/1972 | Dorschner et al. | 161/72 |
| 3,772,247 | 11/1973 | Flannigan | 260/46.5 |
| 3,954,697 | 5/1976 | McConnell et al. | 526/350 |
| 4,072,812 | 2/1978 | McConnell et al. | 526/348.2 |
| 4,166,152 | 8/1979 | Baker et al. | 428/522 |
| 4,379,201 | 4/1983 | Heilmann et al. | 428/345 |
| 4,405,297 | 9/1983 | Appel et al. | 425/72 |
| 4,554,324 | 11/1985 | Husman et al. | 525/301 |
| 4,587,152 | 5/1986 | Gleichenhagen et al. | 428/195 |
| 4,619,979 | 10/1986 | Kotnour et al. | 526/88 |
| 4,684,576 | 8/1987 | Tabor et al. | 428/441 |
| 4,707,531 | 11/1987 | Shirahata | 528/12 |
| 4,737,559 | 4/1988 | Kellen et al. | 526/291 |
| 4,770,320 | 9/1988 | Miles et al. | 221/33 |
| 4,774,310 | 9/1988 | Butler | 528/23 |
| 4,781,306 | 11/1988 | Smith | 221/33 |
| 4,781,957 | 11/1988 | Brown et al. | 428/43 |
| 4,842,303 | 6/1989 | Molenda | 281/38 |
| 4,843,134 | 6/1989 | Kotnour et al. | 526/318.4 |
| 4,895,746 | 1/1990 | Mertens | 428/40 |
| 4,900,474 | 2/1990 | Terae et al. | 252/358 |

(List continued on next page.)

FOREIGN PATENT DOCUMENTS

| | | | |
|---|---|---|---|
| 0 658 351 A1 | 12/1994 | European Pat. Off. | A61L 15/58 |
| 01308472 | 12/1989 | Japan . | |
| WO 96/07522 | 3/1996 | WIPO | B29B 13/02 |
| WO 96/23915 | 8/1996 | WIPO . | |
| WO 96/26253 | 8/1996 | WIPO | G09J 155/00 |
| WO 96/34029 | 10/1996 | WIPO | G08G 18/61 |
| WO 96/34030 | 10/1996 | WIPO | C08G 18/61 |
| WO 96/35458 | 11/1996 | WIPO . | |

OTHER PUBLICATIONS

*Handbook of Pressure Sensitive Adhesive Technology*, Second Edition, D. Satas, ed., Van Nostrand Reinhold, New York, NY 1989, pp. 171–176.

Tyagi et al., "Segmented Organosiloxane Copolymers 2: Thermal and Mechanical Properties of Siloxane urea Copolymers", *Polymer*, vol. 24, Dec., 1984.

*Encyclopedia of Polymer Science and Engineering*, vol. 15, John Wiley & Sons, New York, NY (1989), pp. 265–270.

Wente, "Superfine Thermoplastic Fibers", *Industrial Engineering Chemistry*, vol. 48, pp. 1342 et seq (1956).

*Primary Examiner*—Helen L. Pezzuto
*Attorney, Agent, or Firm*—Gary L. Griswold; Robert W. Sprague; William J. Bond

[57] ABSTRACT

The present invention provides repositionable sheets having a backing and a layer of a nonwoven web thereon. The nonwoven web is prepared from fibers, which can be multilayer fibers, that include a pressure-sensitive adhesive composition.

15 Claims, 1 Drawing Sheet

U.S. PATENT DOCUMENTS

| | | | |
|---|---|---|---|
| 4,935,484 | 6/1990 | Wilfgruber et al. | 528/34 |
| 5,011,186 | 4/1991 | Bodziak et al. | 281/12 |
| 5,028,679 | 7/1991 | Terae et al. | 528/12 |
| 5,080,255 | 1/1992 | Windorski | 221/45 |
| 5,110,890 | 5/1992 | Butler | 528/12 |
| 5,118,775 | 6/1992 | Inomata et al. | 528/12 |
| 5,176,952 | 1/1993 | Joseph et al. | 428/284 |
| 5,194,299 | 3/1993 | Fry | 427/208.6 |
| 5,232,770 | 8/1993 | Joseph | 428/284 |
| 5,236,997 | 8/1993 | Fujiki | 524/731 |
| 5,238,733 | 8/1993 | Joseph et al. | 428/284 |
| 5,248,455 | 9/1993 | Joseph et al. | 264/6 |
| 5,248,739 | 9/1993 | Schmidt et al. | 525/477 |
| 5,258,220 | 11/1993 | Joseph | 428/284 |
| 5,262,558 | 11/1993 | Kobayashi et al. | 556/453 |
| 5,302,685 | 4/1994 | Tsumura et al. | 528/33 |
| 5,319,040 | 6/1994 | Wengrovius et al. | 525/478 |
| 5,378,536 | 1/1995 | Miller et al. | 428/355 |
| 5,506,279 | 4/1996 | Babu et al. | 522/34 |
| 5,637,646 | 6/1997 | Ellis | 525/309 |

REPOSITIONABLE SHEETS WITH A NONWOVEN WEB OF PRESSURE-SENSITIVE ADHESIVE FIBERS

FIELD OF THE INVENTION

The present invention is directed to repositionable sheets, particularly tapes and notes, having an adhesive layer that includes a nonwoven web of pressure-sensitive adhesive fibers.

BACKGROUND OF THE INVENTION

Repositionable sheets, such as tape flags and note paper, are typically disposed in a stack with each of the sheets having a narrow band of the repositionable adhesive coated on one surface along one edge by which the sheets are adhered together. The repositionable adhesive used in these products typically includes an adhesive binder layer containing numerous infusible, solvent-dispersible tacky elastomeric microspheres. Products of this type can be adhered to almost any substrate, including paper, readily removed without delaminating the substrate, and subsequently repositioned. The force required to peel these products from a paper substrate is generally maintained within a range of about 8 grams/centimeter (g/cm) to about 80 g/cm.

Numerous attempts have been made to achieve the results obtainable with microsphere adhesives by substituting more conventional pressure-sensitive adhesives, which typically have continuous-coat (100% coverage) peel adhesion values, when applied to untreated paper, on the order of at least about 100 g/cm width. Such approaches have included the use of pressure-sensitive adhesives having inherently low tack, or thinner coatings of pressure-sensitive adhesives. Other approaches have included deactivating portions of a coating of a pressure-sensitive adhesive, or applying a pressure-sensitive adhesive to only portions of a backing to produce spaced adhesive stripes. None of these approaches have provided products with the performance characteristics equivalent to that of the microsphere-containing adhesives referred to above. Thus, other approaches to the microsphere-containing adhesives are still desired.

SUMMARY OF THE INVENTION

The present invention provides repositionable sheets having a backing and a layer of a nonwoven web thereon. The nonwoven web is prepared from pressure sensitive adhesive fibers, which can be multilayer fibers, that include a pressure-sensitive adhesive composition as a structural component of the fibers. By this it is meant that the pressure-sensitive adhesive composition is an integral component of the fiber itself and not simply a post-fiber formation coating.

The nonwoven web can be in the form of a commingled web of various types of fibers. These various types of fibers may be in the form of separate layers within the nonwoven web, or they may be intimately mixed such that the web has a substantially uniform cross-section.

The pressure-sensitive adhesive composition can include a variety of self tacky or tackified polymers. For example, the pressure-sensitive adhesive composition can include a melt processable polymer or copolymer, such as a polyolefin, a polystyrene, a polyurethane, a polyester, a polyamide, an epoxy, a vinyl acetate, an acrylate, a natural or synthetic rubber, a polydiorganosiloxane polyurea copolymer, and mixtures thereof.

DETAILED DESCRIPTION OF PREFERRED EMBODIMENTS

Figure 1:
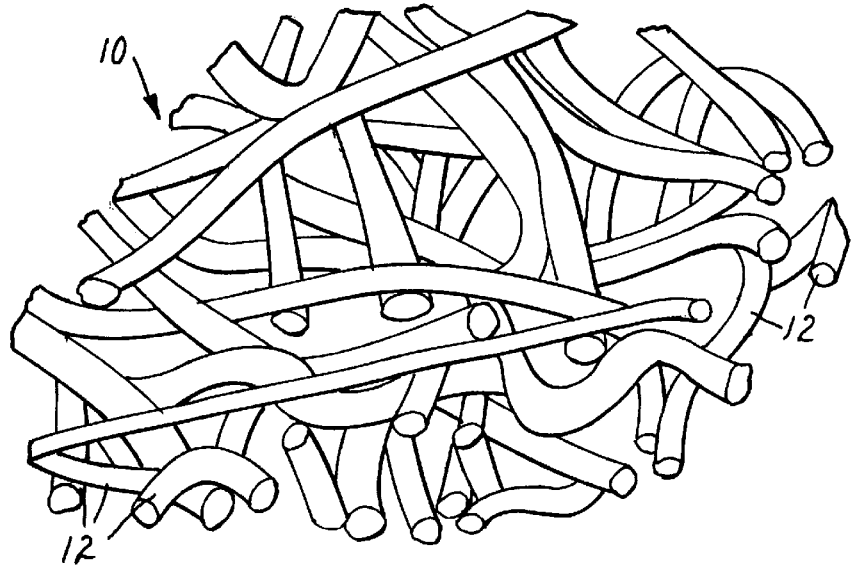
FIG. 1 is a perspective view of a nonwoven web of the present invention made from multilayer fibers.

The present invention provides sheets having a backing and a layer of a repositionable adhesive of the present invention thereon. Preferably, the backing has a first portion coated with the repositionable adhesive and a second portion that is substantially free of adhesive. This second portion is typically substantially free of adhesive on both of its surfaces. The adhesive coated sheets can have one surface completely coated with the repositionable adhesive if desired.

In particularly preferred embodiments, the sheets are in the form of notes wherein the backing is typically made of paper and has a narrow band of a repositionable adhesive coated on one surface along one edge. Alternatively, the sheets can be in the form of tapes (e.g., tape flags) wherein the backing is typically made of a polymeric film and has a first portion coated with the repositionable adhesive and a second portion free of adhesive. For such tapes, the portion coated with the repositionable adhesive is typically transparent and colorless when the adhesive coated film is adhered to a substrate.

The backing can be made of a wide variety of materials, but typically is paper or polymeric film. The repositionable adhesive of the present invention provides an alternative to typical repositionable pressure-sensitive adhesives used, such as those described in U.S. Pat. Nos. 3,691,140 (Silver) and 4,166,152 (Baker et al.). The pressure-sensitive adhesive (PSA) of the present invention: permits the repositionability of the sheet (regardless of the composition of the film or paper); exhibits minimal adhesive transfer to the substrate to which it is adhered; is preferably transparent (although not necessarily); and does not mark or tear the substrate to which it is adhered. Not only is the adhesive respositionable in the short term, but the adhesive does not exhibit long term adhesion build-up, which could result in the loss of repositionability.

The sheets can form a stack with the band of adhesive causing the sheets to be adhered together. The sheets can be stacked with the band of adhesive on adjacent sheets at the same edges of the stack. Alternatively, the sheets can be stacked with the band of adhesive on adjacent sheets at alternate opposite edges of the stack. This latter arrangement affords single hand removal of sheets from a dispenser. When an end of a sheet initially projects through an opening slot in a dispenser and is manually pulled through that slot, the opposite end of the sheet being pulled will carry with it the end of an underlying sheet due to the adhesive engagement therebetween while that end of the underlying sheet slides over the sheet beneath it to which it is not adhesively attached. After the opposite end of the sheet being pulled and the adhesively attached end of the underlying sheet move through the slot, the sheet being pulled will peel away from the underlying sheet to separate it from the dispenser and leave the end of the underlying sheet projecting through the slot.

The pressure-sensitive adhesive used in the repositionable sheets of the present invention is in the form of a coherent nonwoven web of fibers. Such materials possess a four-fold balance of adhesion, cohesion, stretchiness, and elasticity, and a glass transition temperature ($T_g$) of less than about 20° C. Thus, they are tacky to the touch at room temperature (e.g., about 20° C. to about 25° C.), as can be determined by a finger tack test or by conventional measurement devices, and can easily form a useful adhesive bond with the application of light pressure. An acceptable quantitative description of a pressure-sensitive adhesive is given by the Dahlquist criterion line (as described in the *Handbook of Pressure-sensitive Adhesive Technology Second Edition*, D. Satas, ed., Van Nostrand Reinhold, New York, N.Y., 1989, pages 171–176), which indicates that materials having a storage modulus (G') of less than about $3\times10^5$ Pascals (measured at 10 radian/second at a temperature of about 20° C. to about 22° C.) typically have pressure-sensitive adhesive properties while materials having a G' in excess of this value typically do not (and are referred to herein as nonpressure-sensitive adhesive materials).

The fibers typically have a diameter of no greater than about 100 microns ($\mu$m). Preferably, such fibers have a diameter of no greater than about 50 $\mu$m, and often, no greater than about 25 $\mu$m. Fibers of no greater than about 50 $\mu$m are often referred to as "microfibers." They are coherent fibers that can include one material or a mixture of materials in one layer, or multiple materials in multiple layers, for example.

Figure 2:
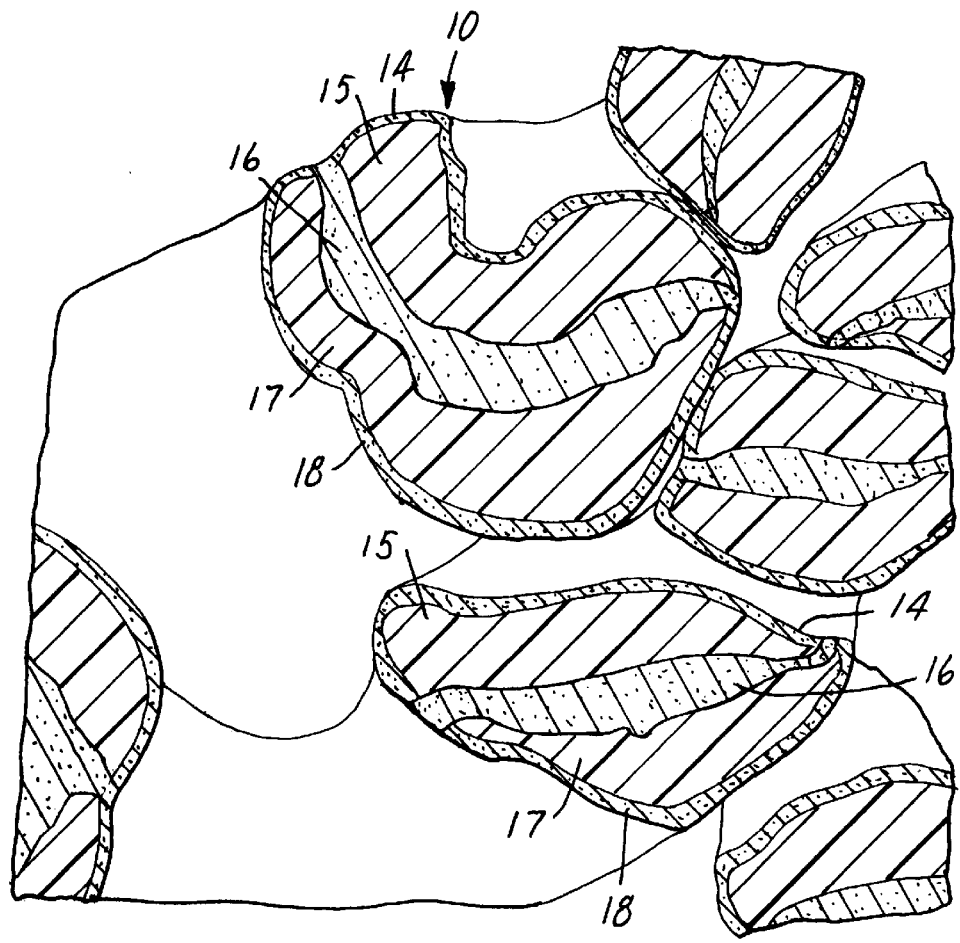
FIG. 2 is a cross-sectional view of the nonwoven web of FIG. 1 at higher magnification showing a five layer construction of the fibers.

FIG. 1 is an illustration of a nonwoven web 10 prepared from multilayered fibers 12 according to the present invention. FIG. 2 is a cross-sectional view of the nonwoven web 10 of FIG. 1 at higher magnification showing a five layer construction of the fibers 12. The multilayered fibers 12 each have five discrete layers of polymeric material. There are three layers 14, 16, 18 of one type of pressure-sensitive adhesive composition, and two layers 15,17 of a second type of pressure-sensitive adhesive composition. It is significant to note, that the surface of the fibers have exposed edges of the layers of both materials. Thus, the fibers, and hence, the nonwoven webs, of the present invention, can demonstrate properties associated with both types of materials simultaneously. Although FIG. 1 illustrates a fiber having five layers of material, the fibers of the present invention can include fewer or many more layers, e.g., hundreds of layers. Thus, the coherent fibers of the present invention can include, for example, only one type of pressure-sensitive adhesive composition in one layer, two or more different types of pressure-sensitive adhesive compositions in two or more layers, or a pressure-sensitive adhesive composition layered with a nonpressure-sensitive adhesive composition in two or more layers. Each of the compositions can be a mixture of different pressure-sensitive adhesive materials and/or nonpressure-sensitive adhesive materials.

Fibers having a diameter of no greater than about 100 microns ($\mu$m), and particularly microfibers having a diameter of no greater than about 50 $\mu$m, have been developed for a variety of uses and with a variety of properties. They are typically used in the form of nonwoven webs that can be used in the manufacture of face masks and respirators, air filters, vacuum bags, oil and chemical spill sorbents, thermal insulation, first aid dressings, medical wraps, surgical drapes, disposable diapers, wipe materials, and the like.

Nonwoven webs of fibers are particularly desirable because they provide a material with a high surface area and have generally high porosity. Nonwoven pressure-sensitive adhesive webs having a high surface area and porosity are desirable because they possess the characteristics of breathability, moisture transmission, conformability, and good adhesion to irregular surfaces.

The fibers can be made by a variety of melt processes, including a spunbond process and a melt-blown process. In a spunbond process, fibers are extruded from a polymer melt stream through multiple banks of spinnerets onto a rapidly moving, porous belt, for example, forming an unbonded web. This unbonded web is then passed through a bonder, typically a thermal bonder, which bonds some of the fibers to neighboring fibers, thereby providing integrity to the web. In a melt-blown process, fibers are extruded from a polymer melt stream through fine orifices using high air velocity attenuation onto a rotating drum, for example, forming an autogenously bonded web. In contrast to a spunbond process, no further processing is necessary.

Suitable polymers (including copolymers) for making the pressure-sensitive adhesive nonwoven webs for use in the repositionable sheets of the present invention are those that are capable of being extruded and forming fibers in a melt process without substantial degradation or gelling. That is, suitable polymers are those that have a relatively low viscosity in the melt such that they can be readily extruded. Such polymers preferably have an apparent viscosity in the melt (i.e., at melt blowing conditions) in a range of about 150 poise to about 800 poise as measured by either capillary rheometry or cone and plate rheometry. Preferred polymers are those that are capable of forming a melt stream in a melt blown process that maintains its integrity with few if any breaks in the melt stream. That is, preferred polymers have an extensional viscosity that allows them to be drawn effectively into fibers.

Suitable polymers form fibers that have sufficient cohesive strength and integrity at their use temperature such that a web formed therefrom maintains its fibrous structure. The fibers should also have relatively low or no cold flow, and display good aging properties, such that the fibers maintain their shape and adhesive properties over an extended period of time.

To tailor the properties of the fibers, one or more polymers can be used to make conjugate fibers of the present invention. These different polymers can be in the form of polymeric mixtures (preferably, compatible polymeric blends), two or more layered fibers, sheath-core fiber arrangements, or in "island in the sea" type fiber structures. Generally, the pressure-sensitive adhesive component will provide at least a portion of the exposed outer surface of a multicomponent conjugate fiber. Preferably, with multilayered conjugate fibers, the individual components will be present substantially continuously along the fiber length in discrete zones, which zones preferably extend along the entire length of the fibers.

The polymers may or may not be inherently tacky. In the polymeric mixtures (e.g., polymeric blends), the different polymers may or may not be compatible with each other, as long as the overall mixture is a fiber forming composition. Preferably, however, the rheological properties in the melt of the polymers in a polymeric mixture are well matched.

Examples of suitable melt processable polymers or copolymers include, but are not limited to, acrylates; polyolefins such as polyethylene, polypropylene, polybutylene, polyhexene, polyoctene; polystyrenes; polyurethanes; polyesters such as polyethyleneterephthalate; polyamides such as nylon; natural or synthetic rubber resins such as styrenic block copolymers of the type available under the trade designation KRATON (e.g., styrene/isoprene/styrene, styrene/butadiene/styrene); epoxies; vinyl acetates such as ethylene vinyl acetate; polydiorganosiloxane polyurea copolymers; copolymers thereof and mixtures thereof. These polymers may or may not have pressure-sensitive adhesive properties, as long as the overall fiber, and the resultant nonwoven web, has pressure-sensitive adhesive properties. As a result, layered fiber constructions can be formed having alternating pressure-sensitive and nonpressure-sensitive adhesive properties or differing levels of tack (e.g., pressure-sensitive adhesive properties), for example.

Preferably, the fibers include a pressure-sensitive adhesive composition comprising polymers or copolymers selected from the group of acrylates; polyolefins; tackified natural or synthetic rubber resins; vinyl acetates; polydiorganosiloxane polyurea copolymers; and mixtures thereof. Other polymers or copolymers may be mixed with these polymers or copolymers including those selected from the group of polystyrenes; polyurethanes; polyesters; polyamides such; epoxies; copolymers thereof and mixtures thereof.

Rubber Resin Pressure-Sensitive Adhesives

Suitable rubber resin adhesives include those formed using a tackified elastomer where a preferred elastomer is an A-B type block copolymer wherein the A block and B blocks are configured in linear (e.g., a diblock or triblock copolymer), radial or star configurations. The A block is formed of a mono-alkenylarene, preferably a polystyrene block having a molecular weight between 4000 and 50,000, preferably between 7000 and 30,000. The A block content is preferably about 10 to 50 weight percent, preferably about 10 to 30 weight percent of the block copolymer. Other suitable A blocks may be formed from alpha-methylstyrene, t-butyl-styrene and other ring alkylated styrenes, as well as mixtures thereof. The B block is formed of an elastomeric conjugated diene, generally polyisoprene, polybutadiene or copolymers thereof having an average molecular weight from about 5000 to about 500,000, preferably from about 50,000 to about 200,000. The B block dienes can also be hydrogenated. The B block content is generally 90 to 50 percent, preferably 90 to 70 percent by weight. The tackifying components for the elastomer based adhesives generally comprise solid tackifying resin and/or a liquid tackifier or plasticizer. Preferably, the tackifying resins are selected from the group of resins at least partially compatible with the polydiene B block portion of the elastomer. Although not preferred, generally a relatively minor amount of the tackifying resin can include resins compatible with the A block, which when present are generally termed end block reinforcing resins. Generally, end block resins are formed from aromatic monomer species. Suitable liquid tackifiers or plasticizers for use in the adhesive composition include napthenic oils, paraffin oils, aromatic oils, mineral oils or low molecular weight rosin esters, polyterpenes and $C_5$ resins. Some suitable B-block compatible solid tackifying resins include $C_5$ resins, resin esters, polyterpenes and the like.

The tackifier portion of the pressure-sensitive adhesive generally comprises from 20 parts to 300 parts per 100 parts of the elastomer. Preferably, this is predominately solid tackifier, however, from 0 to 25 weight percent, preferably 0 to 10 weight percent of the adhesive composition can be liquid tackifier and/or plasticizer.

Suitable rubber resin adhesives for melt blown processing are discussed in European Application No. 658351 which exemplifies melt-blown fibrous synthetic rubber resin type adhesives used in a disposable absorbent article to either immobilize particulate sorbents or used as a pressure-sensitive adhesive attachment (e.g., for a sanitary napkin). Suitable adhesives exemplified are styrene-isoprene-styrene triblock block copolymer based, where the copolymer has coupling efficiencies ranging from 42 to 65 percent (e.g., 58 to 35 percent polystyrene/polyisoprene diblock material would be present), tackified with C-5 hydrocarbon resins (WINGTACK PLUS and WINGTACK 10) and stabilized with antioxidants.

Polyolefin Pressure-Sensitive Adhesives

Suitable polyolefin adhesives include tackified polyolefin elastomer adhesives, or amophous poly(alpha-olefin) polymers suitable for forming hot melt pressure-sensitive adhesives with or without added tackifier. Such amorphous poly(alpha-olefin) polymers are generally copolymers of $C_3$ to $C_5$ linear alpha-olefin(s) and a higher alpha-olefin(s) (generally $C_6$ to $C_{10}$). Preferred are copolymers of polyolefins with polyhexene, polyheptene, polyoctene, polynonene, and/or polydecene. Such amorphous poly(alpha-olefins) are described in U.S. Pat. Nos. 4,684,576 (Tabor), 3,954,697 (McConnell et al.), and 4,072,812 (McConnell et al.), where the amorphous poly(alpha-olefin) copolymers can be used without added tackifiers to directly form a pressure-sensitive adhesive. These amorphous copolymers generally have from 40 mole percent to 60 mole percent of the higher alpha-olefin comonomer(s). However, suitable compatible tackifying resins and plasticizing oils can be used that generally correspond to those used to tackify the synthetic AB block copolymer elastomers described above. For example, suitable compatible liquid or solid tackifiers include hydrocarbon resins, such as polyterpenes, $C_5$ hydrocarbon resins, or polyisoprenes. Also, resin esters of aromatic or aliphatic acids are suitable. If these tackifiers are used in sufficient amounts, the higher alpha-olefin content can be as low as 15 mole percent and still suitable pressure-sensitive adhesives can be formed.

Acrylate Copolymer Pressure-Sensitive Adhesives

Suitable poly(acrylates) are derived from: (A) at least one monofunctional alkyl (meth)acrylate monomer (i.e., allyl acrylate and alkyl methacrylate monomer); and (B) at least one monofunctional free-radically copolymerizable reinforcing monomer. The reinforcing monomer has a homopolymer glass transition temperature ($T_g$ higher than that of the alkyl (meth)acrylate monomer and is one that increases the glass transition temperature and modulus of the resultant copolymer. Monomers A and B are chosen such that a copolymer formed from them is extrudable and capable of forming fibers. Herein, "copolymer" refers to polymers containing two or more different monomers, including terpolymers, tetrapolymers, etc.

Preferably, the monomers used in preparing the pressure-sensitive adhesive copolymer fibers of the present invention include: (A) a monofunctional alkyl (meth)acrylate monomer that, when homopolymerized, generally has a glass transition temperature of no greater than about 0° C.; and (B) a monofunctional free-radically copolymerizable reinforcing monomer that, when homopolymerized, generally has a glass transition temperature of at least about 10° C. The glass transition temperatures of the homopolymers of monomers A and B are typically accurate to within ±5° C. and are measured by differential scanning calorimetry.

Monomer A, which is a monofunctional alkyl acrylate or methacrylate (i.e., (meth)acrylic acid ester), contributes to the flexibility and tack of the copolymer. Preferably, monomer A has a homopolymer $T_g$ of no greater than about 0° C. Preferably, the alkyl group of the (meth)acrylate has an average of about 4 to about 20 carbon atoms, and more preferably, an average of about 4 to about 14 carbon atoms. The alkyl group can optionally contain oxygen atoms in the chain thereby forming ethers or alkoxy ethers, for example.

Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, poly-ethoxylated or —propoxylated methoxy (meth)acrylate (i.e., poly(ethylene/propylene oxide) mono(meth)acrylate) macromers (i.e., macromolecular monomers), polymethylvinyl ether mono (meth)acrylate macromers, and ethoxylated or propoxylated nonylphenol acrylate macromers. The molecular weight of such macromers is typically about 100 grams/mole to about 600 grams/mole, and preferably, about 300 grams/mole to about 600 grams/mole. Combinations of various monofunctional monomers categorized as an A monomer can be used to make the copolymer used in making the fibers of the present invention.

Monomer B, which is a monofunctional free-radically copolymerizable reinforcing monomer; increases the glass transition temperature of the copolymer. As used herein, "reinforcing" monomers are those that increase the modulus of the adhesive, and thereby its strength. Preferably, monomer B has a homopolymer $T_g$ of at least about 10° C. More preferably, monomer B is a reinforcing monofunctional (meth)acrylic monomer, including an acrylic acid, a methacrylic acid, an acrylamide, and an acrylate. Examples of monomer B include, but are not limited to, acrylamides, such as acrylamide, methacrylamide, N-methyl acrylamide, N-ethyl acrylamide, N-methylol acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dimethylol acrylamide, N,N-dihydroxyethyl acrylamide, t-butyl acrylamide, dimethylaminoethyl acrylamide, N-octyl acrylamide, and 1,1,3,3-tetramethylbutyl acrylamide. Other examples of monomer B include acrylic acid and methacrylic acid, itaconic acid, crotonic acid, maleic acid, fumaric acid, 2,2-(diethoxy)ethyl acrylate, hydroxyethyl acrylate or methacrylate, 2-hydroxypropyl acrylate or methacrylate, methyl methacrylate, isobutyl acrylate, n-butyl methacrylate, isobomyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl pyrrolidone, and N-vinyl caprolactam. Combinations of various reinforcing monofunctional monomers categorized as a B monomer can be used to make the copolymer used in making the fibers of the present invention.

The acrylate copolymer is preferably formulated to have a resultant $T_g$ of less than about 25° C. and more preferably, less than about 0° C. Such acrylate copolymers preferably include about 60 parts to about 98 parts per hundred of at least one alkyl (meth)acrylate monomer and about 2 parts to about 40 parts per hundred of at least one copolymerizable reinforcing monomer. Preferably, the acrylate copolymers have about 85 parts to about 98 parts per hundred or at least one alkyl (meth)acrylate monomer and about 2 parts to about 15 parts of at least one copolymerizable reinforcing monomer.

A crosslinking agent can be used if so desired to build the molecular weight and the strength of the copolymer, and hence improve the integrity and shape of the fibers. Preferably, the crosslinking agent is one that is copolymerized with monomers A and B. The crosslinking agent may produce chemical crosslinks (e.g., covalent bonds). Alternatively, it may produce physical crosslinks that result, for example, from the formation of reinforcing domains due to phase separation or acid base interactions. Suitable crosslinking agents are disclosed in U.S. Pat. Nos. 4,379,201 (Heilman), 4,737,559 (Kellen), 5,506,279 (Babu et al.), and 4,554,324 (Husman).

This crosslinking agent is preferably not activated towards crosslinking until after the copolymer is extruded and the fibers are formed. Thus, the crosslinking agent can be a photocrosslinking agent, which, upon exposure to ultraviolet radiation (e.g., radiation having a wavelength of about 250 nanometers to about 400 nanometers), causes the copolymer to crosslink. Preferably, however, the crosslinking agent provides crosslinking, typically, physical crosslinking, without further processing. Physical crosslinking can occur through phase separation of domains which produces thermally reversible crosslinks. Thus, acrylate copolymers prepared from a crosslinker that provides reversible physical crosslinking are particularly advantageous in the preparation of fibers using a melt process.

Preferably, the crosslinking agent is (1) an acrylic crosslinking monomer, or (2) a polymeric crosslinking material having a copolymerizable vinyl group. More preferably, the crosslinking agent is a polymeric crosslinking material having a copolymerizable vinyl group. Preferably, each of these monomers is a free-radically polymerizable crosslinking agent capable of copolymerizing with monomers A and B. Combinations of various crosslinking agents can be used to make the copolymer used in making the fibers of the present invention. It should be understood, however, that such crosslinking agents are optional.

The acrylic crosslinking monomer is preferably one that is copolymerized with monomers A and B and generates free radicals in the polymer backbone upon irradiation of the polymer. An examples such a monomer is an acrylated benzophenone as described in U.S. Pat. No. 4,737,559 (Kellen et al.).

The polymeric crosslinking materials that have a copolymerizable vinyl group is preferably represented by the general formula X-(Y)$_n$-Z wherein: X is a copolymerizable vinyl group; Y is a divalent linking group where n can be zero or one; and Z is a monovalent polymeric moiety having a $T_g$ greater than about 20° C. and a weight average molecular weight in the range of about 2,000 to about 30,000 and being essentially unreactive under copolymerization conditions. Particularly preferred vinyl-terminated polymeric monomers useful in making the microfibers of the present invention are further defined as having: an X group which has the formula HR$^1$C=CR$^2$— wherein R$^1$ is a hydrogen atom or a COOH group and R$^2$ is a hydrogen atom or a methyl group; a Z group which has the formula —{C(R$^3$)R$^4$)—CH$_2$}$_n$—R$^5$ wherein R$^3$ is a hydrogen atom or a lower (i.e., C$_1$–C$_4$) alkyl group, R$^5$ is a lower alkyl group, n is an integer from 20 to 500, and R$^4$ is a monovalent radical selected from the group consisting of —C$_6$H$_4$R$^6$ and —CO$_2$R$^7$ wherein R$^6$ is a hydrogen atom or a lower alkyl group and R$^7$ is a lower alkyl group.

Such vinyl-terminated polymeric crosslinking monomers are sometimes referred to as macromolecular monomers (i.e., "macromers"). Once polymerized with the (meth) acrylate monomer and the reinforcing monomer, a vinyl-terminated polymeric monomer of this type forms a copolymer having pendant polymeric moieties which tend to reinforce the otherwise soft acrylate backbone, providing a substantial increase in the shear strength of the resultant copolymer adhesive. Specific examples of such crosslinking polymeric materials are disclosed in U.S. Pat. No. 4,554,324 (Husman et al.).

If used, the crosslinking agent is used in an effective amount, by which is meant an amount that is sufficient to cause crosslinking of the pressure-sensitive adhesive to provide the desired final adhesion properties to the substrate of interest. Preferably, if used, the crosslinking agent is used in an amount of about 0.1 part to about 10 parts, based on the total amount of monomers.

If a photocrosslinking agent has been used, the adhesive in the form of fibers can be exposed to ultraviolet radiation having a wavelength of about 250 nm to about 400 nm. The radiant energy in this preferred range of wavelength required to crosslink the adhesive is about 100 milliJoules/centimeter$^2$ (mJ/cm$^2$) to about 1,500 mJ/cm$^2$, and more preferably, about 200 mJ/cm$^2$ to about 800 mJ/cm$^2$.

The acrylate pressure-sensitive adhesives of the present invention can be synthesized by a variety of free-radical polymerization processes, including solution, radiation, bulk, dispersion, emulsion, and suspension polymerization processes. Bulk polymerization methods, such as the continuous free radical polymerization method described in U.S. Pat. Nos. 4,619,979 or 4,843,134 (both to Kotnour et al.), the essentially adiabatic polymerization methods using a batch reactor described in U.S. Pat. No. 5,637,646 (Ellis), and the methods described for polymerizing packaged pre-adhesive compositions described in International patent application Ser. No. WO 96/07522, may also be utilized to prepare the polymer used in the preparation of the fibers of the present invention.

The acrylate pressure-sensitive adhesive compositions of the present invention can include conventional additives such as tackifiers (wood rosin, polyesters, etc.), plasticizers, flow modifiers, neutralizing agents, stabilizers, antioxidants, fillers, colorants, and the like, as long as they do not interfere in the fiber-forming melt process. Initiators that are not copolymerizable with the monomers used to prepare the acrylate copolymer can also be used to enhance the rate of polymerization and/or crosslinking. These additives are incorporated in amounts that do not materially adversely affect the desired properties of the pressure-sensitive adhesives or their fiber-forming properties. Typically, they can be mixed into these systems in amounts of about 0.05 weight percent to about 25 weight percent, based on the total weight of the composition.

Polydiorganosiloxane Polyurea Copolymer Pressure-Sensitive Adhesives

Suitable polydiorganosiloxane polyurea copolymers that can be used in the preparation of fibers, preferably microfibers, according to the present invention are the reaction products of at least one polyamine, wherein the polyamine comprises at least one polydiorganosiloxane polyamine (preferably, diamine), or a mixture of at least one polydiorganosiloxane polyamine (preferably, diamine) and at least one organic amine, with at least one polyisocyanate, wherein the mole ratio of isocyanate to amine is preferably in a range of about 0.9:1 to about 1.3:1. That is, preferred polydiorganosiloxane polyurea copolymers suitable for use in the preparation of fibers according to the present invention have soft polydiorganosiloxane units, hard polyisocyanate residue units, and optionally, soft and/or hard organic polyamine residue units and terminal groups. The hard polyisocyanate residue and the hard polyamine residue comprise less than 50% by weight of the polydiorganosiloxane polyurea copolymer. The polyisocyanate residue is the polyisocyanate minus the —NCO groups and the polyamine residue is the polyamine minus the —NH$_2$ groups. The polyisocyanate residue is connected to the polyamine residue by the urea linkages. The terminal groups may be nonfunctional groups or functional groups depending on the purpose of the polydiorganosiloxane polyurea copolymers. Examples of such segmented copolymers are disclosed in International Publication Nos. WO 96/34029 and WO 96/35458, both to the 3M Company, St. Paul, Minn., and U.S. patent application Ser. No. 08/735,836, filed Oct. 23, 1996. As used herein, the term "polydiorganosiloxane polyurea" encompasses materials having the repeating unit of Formula I and low molecular weight oligomeric materials having the structure of Formula II. Such compounds are suitable for use in the present invention if they can be melt processed.

Preferred polydiorganosiloxane polyurea copolymers used in preparing the fibers of the present invention can be represented by the repeating unit:

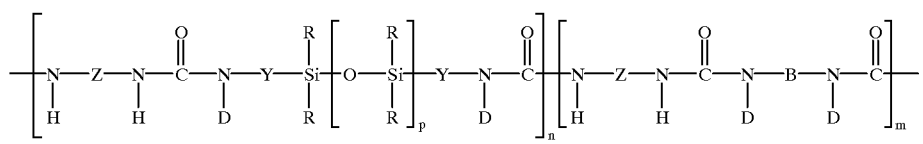

(I)

where:

each R is a moiety that independently is an alkyl moiety preferably having 1 to 12 carbon atoms and may be substituted with, for example, trifluoroalkyl or vinyl groups, a vinyl moiety or higher alkenyl moiety preferably represented by the formula —R$^2$(CH$_2$)$_a$CH═CH$_2$ wherein R$^2$ is —(CH$_2$)$_b$— or —(CH$_2$)$_c$CH═CH— and a is 1, 2, or 3; b is 0, 3, or 6; and c is 3, 4, or 5, a cycloalkyl moiety having 6 to 12 carbon atoms and may be substituted with alkyl, fluoroalkyl, and vinyl groups, or an aryl moiety preferably having 6 to 20 carbon atoms and may be substituted with, for example, alkyl, cycloalkyl, fluoroalkyl and vinyl groups or R is a perfluoroalkyl group as described in U.S. Pat. No. 5,028,679 (Terae et al.), a fluorine-containing group, as described in U.S. Pat. No. 5,236,997 (Fijiki), or a perfluoroether-containing group, as described in U.S. Pats. No. 4,900,474 (Terae et al.) and 5,118,775 (Inomata et al.); preferably at least 50% of the R moieties are methyl moieties with the balance being monovalent alkyl or substituted alkyl moieties having 1 to 12 carbon atoms, alkenylene moieties, phenyl moieties, or substituted phenyl moieties;

each Z is a polyvalent moiety that is an arylene moiety or an aralkylene moiety preferably having 6 to 20 carbon atoms, an alkylene or cycloalkylene moiety preferably having 6 to 20 carbon atoms, preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3- methylenecyclohexylene, 1,6-hexamethylene, 1,4-cyclohexylene, 2,2,4-trimethylhexylene and mixtures thereof;

each Y is a polyvalent moiety that independently is an alkylene moiety preferably having 1 to 10 carbon atoms, an aralkylene moiety or an arylene moiety preferably having 6 to 20 carbon atoms;

each D is independently selected from the group consisting of hydrogen, an alkyl moiety of 1 to 10 carbon atoms, phenyl, and a moiety that completes a ring structure including B or Y to form a heterocycle;

B is a polyvalent moiety selected from the group consisting of alkylene, aralkylene, cycloalkylene, phenylene, polyalkylene oxide, including for example, polyethylene oxide, polypropylene oxide, polytetramethylene oxide, and copolymers and mixtures thereof;

m is a number that is 0 to about 1000;

n is a number that is equal to or greater than 1; and p is a number that is about 5 or larger, preferably, about 15 to about 2000, more preferably, about 30 to about 1500.

In the use of polyisocyanates (Z is a moiety having a functionality greater than 2) and polyamines (B is a moiety having a functionality greater than 2), the structure of Formula I will be modified to reflect branching at the polymer backbone. In the use of endcapping agents, the structure of Formula I will be modified to reflect termination of the polydiorganosiloxane polyurea chain.

Lower molecular weight polydiorganosiloxane oligourea segmented copolymers provide a means of varying the modulus of elasticity of compositions containing this component. They can serve to either increase or decrease the modulus of the resultant composition, depending upon the particular polydiorganosiloxane mono- and di-amines employed in the preparation of the polydiorganosiloxane oligourea segmented copolymer. Examples of such segmented copolymers are disclosed in International Publication Nos. WO 96/34029 and WO 96/34030, both to the 3M Company.

The lower molecular weight polydiorganosiloxane oligourea segmented copolymers can be represented by Formula II, as follows:

q is a number of about 5 to about 2000 or larger;

r is a number of about 1 to about 2000 or larger; and t is a number up to about 8.

These lower molecular weight polydiorganosiloxane oligourea copolymers can be used alone or in combination with the higher molecular weight polydiorganosiloxane polyurea copolymers (e.g., wherein, n in Formula I is greater than 8). For example, higher molecular weight polydiorganosiloxane polyurea copolymers can be layered with these lower molecular weight polydiorganosiloxane oligourea segmented copolymers. Alternatively, the higher molecular weight polydiorganosiloxane polyurea copolymers can optionally be blended with a lower molecular weight polydiorganosiloxane oligourea segmented copolymer which, when present, is preferably present in an amount of from about 5 parts to about 50 parts per 100 total parts of the composition. If the lower molecular weight polydiorganosiloxane oligourea copolymers are used alone, they may need to be cured (e.g., UV cured) substantially immediately upon forming the fibers (e.g., substantially immediately upon forming the web and before the web is rolled for storage) to maintain sufficient fiber integrity.

The polydiorganosiloxane polyurea copolymers can be made, stored, and then extruded into the form of fibers. If the preformed polymer does not have pressure-sensitive adhesive properties, it optionally can be coextruded with a tackifier during the fiber-forming melt process. Alternatively, the polymers can be prepared in situ (e.g., in an extruder), with or without pressure-sensitive adhesive properties, and then immediately formed into fibers.

Preferably, the polydiorganosiloxane polyurea copolymers can be made by solvent-based processes known to the art, by a solventless process or by a combination of the two. Solvent-based processes are well known in the art. Examples of solvent-based processes by which the polydiorganosiloxane polyurea copolymer useful in the present invention can be prepared include: Tyagi et al., "Segmented Organosiloxane Copolymers: 2. Thermal and Mechanical Properties of Siloxane urea Copolymers," *Polymer*, Vol. 25, December, 1984 and U.S. Pat. No. 5,214,119 (Leir et al.).

Tackifying materials for the polydiorganosiloxane polyurea copolymer, generally silicate resins, can also be added

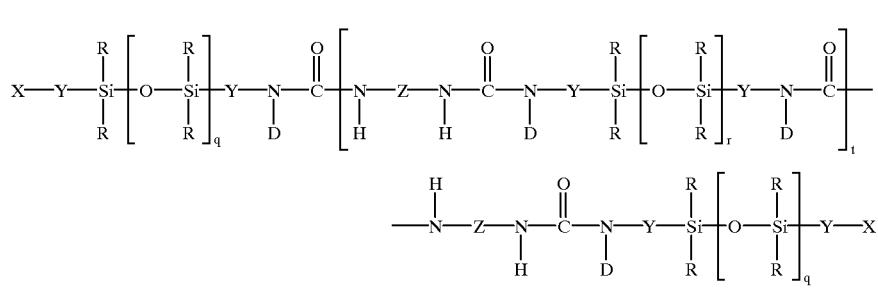

(II)

where: Z, Y, R, and D are previously described;

each X is a monovalent moiety which is not reactive under moisture curing or free radical curing conditions and which independently is an alkyl moiety preferably having about 1 to about 12 carbon atoms and which may be substituted with, for example, trifluoroalkyl or vinyl groups or an aryl moiety preferably having about 6 to about 20 carbon atoms and which may be substituted with, for example, alkyl, cycloalkyl, fluoroalkyl and vinyl groups;

to the polymer to provide or enhance the pressure-sensitive adhesive properties of the polymer. Thus, preferred embodiments of the present invention include a pressure-sensitive adhesive component comprising one or more tackified polydiorganosiloxane polyurea copolymer. As used herein, a pressure-sensitive adhesive possesses a four-fold balance of adhesion, cohesion, stretchiness, and elasticity, and a glass transition temperature ($T_g$) of less than about 20° C. Thus, they are tacky to the touch at room temperature (e.g., about 20° C. to about 25° C.), as can be determined by a finger tack test or by conventional measurement devices, and can easily form a useful adhesive bond with the application of light pressure.

The silicate resin can play an important role in determining the physical properties of the polydiorganosiloxane polyurea copolymer of the present invention. For example, as silicate resin content is increased from low to high concentration, the glassy to rubbery transition of the polydiorganosiloxane polyurea copolymer occurs at increasingly higher temperatures. One need not be limited to a single silicate resin as it may be beneficial to employ a combination of resins in a single composition to achieve desired performance.

The silicate resins useful in the present invention include those resins composed of the following structural units M, D, T, and Q, and combinations thereof. Typical examples include MQ silicate resins, MQD silicate resins, and MQT silicate resins which also may be referred to as copolymeric silicate resins and which preferably have a number average molecular weight of about 100 to about 50,000, more preferably about 500 to about 10,000 and generally have methyl substituents. The silicate resins also include both nonfunctional and functional resins, the functional resins having one or more functionalities including, for example, silicon-bonded hydrogen, silicon-bonded alkenyl, and silanol. MQ silicate resins are copolymeric silicate resins having $R'_3SiO_{1/2}$ units and $SiO_{4/2}$ units. Such resins are described in, for example, *Encyclopedia of Polymer Science and Engineering*, vol. 15, John Wiley & Sons, New York, (1989), pp. 265–270, and U.S. Pat. Nos. 2,676,182 Q)audt et al.), 3,627,851 Grady), 3,772,247 (Flannigan), and 5,248,739 (Schmidt et al.). MQ silicate resins having functional groups are described in U.S. Pat. No. 4,774,310 (Butler) that has silyl hydride groups, U.S. Pat. No. 5,262,558 (Kobayashi et al.) that has vinyl and trifluoropropyl groups, and U.S. Pat. No. 4,707,531 (Shirahata) that has silyl hydride and vinyl groups. The above-described resins are generally prepared in solvent. Dried, or solventless, MQ silicate resins can be prepared, as described in U.S. Pat. Nos. 5,319,040 (Wengrovius et al.), 5,302,685 (Tsumura et al.), and 4,935,484 (Wolfgruber et al.). MQD silicate resins are terpolymers having $R'_3SiO_{1/2}$ units, $SiO_{4/2}$ units, and $R'_2SiO_{2/2}$ units such as are taught in U.S. Pat. No. 2,736,721 (Dexter). MQT silicate resins are terpolymers having $R'_3SiO_{1/2}$ units, $SiO_{4/2}$ units and $R'SiO_{3/2}$ units such as are taught in U.S. Pat. No. 5,110,890 (Butler), and Japanese Kokai HE 2-36234.

Commercially available silicate resins include SR-545, MQ resin in toluene, available from General Electric Co., Silicone Resins Division, Waterford, N.Y.; MQOH resins, which are MQ resins available from PCR, Inc. Gainesville, Fla.; MQR-32-1, MQR-32-2, and MQR-32-3 which are MQD resins in toluene, available from Shin-Etsu Silicones of America, Inc., Torrance, Calif., and PC-403 a hydride functional MQ resin in toluene available from Rhone-Poulenc, Latex and Specialty Polymers, Rock Hill, S.C. Such resins are generally supplied in organic solvent and may be employed in compositions of the present invention as received. However, these organic solutions of silicate resin may also be dried by any number of techniques known in the art, such as spray drying, oven drying and the like, or steam separation to provide a silicate resin at substantially 100% nonvolatile content for use in compositions of the present invention. Also useful in polydiorganosiloxane polyurea copolymers of the present invention are blends of two or more silicate resins. In addition or in place of the silicate resins, organic tackifiers may be used.

When a tackifying material is included with the polydiorganosiloxane polyurea copolymer, that component preferably contains about 1 part to about 80 parts by weight tackifying material and more preferably about 15 parts to about 75 parts by weight tackifying material. The total parts by weight of the polydiorganosiloxane polyurea copolymer and the silicate resin in the combination equal 100. The optimum amount of tackifying material depends on such factors as the type and amount of reactants used, the molecular weight of the hard and soft segments of the polydiorganosiloxane polyurea segmented copolymer, and the intended use of the composition of the invention.

Optional Additives

Fillers, plasticizers, and other property modifiers, such as flow modifiers, dyes, pigments, flame retardants, stabilizers, antioxidants, compatibilizers, antimicrobial agents, electrical conductors, and thermal conductors, may be incorporated in the pressure-sensitive adhesive composition, as long as they do not interfere in the fiber-forming melt process or do not detrimentally effect the function and functionality of the final polymer product. These additives can be blended into these systems in amounts of about 1 volume percent to about 50 volume percent of the composition of the invention.

Preparation of Fibers and Nonwoven Webs

Melt processes for the preparation of fibers are well-known in the art. For example, such processes are disclosed in Wente, "Superfine Thermoplastic Fibers," in *Industrial Engineering Chemistry*, Vol. 48, pages 1342 et seq (1956); Report No. 4364 of the Naval Research Laboratories, published May 25, 1954, entitled "Manufacture of Superfine Organic Fibers" by Wente et al.; as well as in International Publication No. WO 96/23915, and U.S. Pat. Nos. 3,338,992 (Kinney), 3,502,763 (Hartmann), 3,692,618 (Dorschner et al.), and 4,405,297 (Appel et al.). Such processes include both spunbond processes and melt-blown processes. A preferred method for the preparation of fibers, particularly microfibers, and nonwoven webs thereof, is a melt-blown process. For example, nonwoven webs of multilayer microfibers and melt-blown processes for producing them are disclosed in U.S. Pat. Nos. 5,176,952 (Joseph et al.), 5,232,770 (Joseph), 5,238,733 (Joseph et al.), 5,258,220 (Joseph), 5,248,455 (Joseph et al.). These and other melt processes can be used in the formation of the nonwoven webs of the present invention.

Melt-blown processes are particularly preferred because they form autogenously bonded webs that typically require no further processing to bond the fibers together. The melt-blown processes used in the formation of multilayer microfibers as disclosed in the Joseph (et al.) patents listed above are particularly suitable for use in making the multilayer microfibers of the present invention. Such processes use hot (e.g., equal to or about 20° C. to about 30° C. higher than the polymer melt temperature), high-velocity air to draw out and attenuate extruded polymeric material from a die, which will generally solidify after traveling a relatively short distance from the die. The resultant fibers are termed melt-blown fibers and are generally substantially continuous. They form into a coherent web between the exit die orifice and a collecting surface by entanglement of the fibers due in part to the turbulent airstream in which the fibers are entrained.

For example, U.S. Pat. No. 5,238,733 (Joseph et al.) describes forming a multicomponent melt-blown microfiber web by feeding two separate flow streams of organic polymeric material into a separate splitter or combining manifold. The split or separated flow streams are generally combined immediately prior to the die or die orifice. The separate flow streams are preferably established into melt streams along closely parallel flow paths and combined where they are substantially parallel to each other and the flow path of the resultant combined multilayered flow stream. This multilayered flow stream is then fed into the die and/or die orifices and through the die orifices. Air slots are disposed on either side of a row of the die orifices directing uniform heated air at high velocities at the extruded multi-component melt streams. The hot high velocity air draws and attenuates the extruded polymeric material which solidified after traveling a relatively short distance from the die. Single layer microfibers can be made in an analogous manner with air attenuation using a single extruder, no splitter, and a single port feed die.

The solidified or partially solidified fibers form an interlocking network of entangled fibers, which are collected as a coherent web. The collecting surface can be a solid or perforated surface in the form of a flat surface or a drum, a moving belt, or the like. If a perforated surface is used, the backside of the collecting surface can be exposed to a vacuum or low-pressure region to assist in the deposition of the fibers. The collector distance is generally about 7 centimeters (cm) to about 130 cm from the die face. Moving the collector closer to the die face, e.g., about 7 cm to about 30 cm, will result in stronger inter-fiber bonding and a less lofty web.

The solidified or partially solidified fibers form an interlocking network of entangled fibers, which are collected as a web. The collecting surface can be a solid or perforated surface in the form of a flat surface or a drum, a moving belt, or the like. If a perforated surface is used, the backside of the collecting surface can be exposed to a vacuum or low-pressure region to assist in the deposition of the fibers. The collector distance is generally about 7 centimeters (cm) to about 130 cm from the die face. With closer placement of the collector, the fibers are collected when they have more velocity and are more likely to have residual tackiness from incomplete cooling. Moving the collector closer to the die face, e.g., about 7 cm to about 30 cm, will result in stronger inter-fiber bonding and a less lofty web. Moving the collector further away will generally tend to yield a loftier and less coherent web.

The temperature of the separate polymer flowstreams is typically controlled to bring the polymers to substantially similar viscosities. When the separate polymer flowstreams converge, they should generally have an apparent viscosity in the melt (i.e., at melt blowing conditions) of about 150 poise to about 800 poise, as determined using a capillary rheometer. The relative viscosities of the separate polymeric flowstreams to be converged should generally be fairly well matched.

The size of the polymeric fibers formed depends to a large extent on the velocity and temperature of the attenuating airstream, the orifice diameter, the temperature of the melt stream, and the overall flow rate per orifice. Typically, fibers having a diameter of no greater than about 10 µm can be formed, although coarse fibers, e.g., up to about 50 µm or more, can be prepared using a melt-blown process, and up to about 100 µm, can be prepared using a spun bond process. The webs formed can be of any suitable thickness for the desired and intended end use. Generally, a thickness of about 0.01 cm to about 5 cm is suitable for most applications.

The pressure-sensitive adhesive fibers of the present invention can be mixed with other fibers, such as staple fibers, including inorganic and organic fibers, such as thermoplastic fibers, carbon fibers, glass fibers, mineral fibers, or organic binder fibers, as well as fibers of a different polymers. The pressure-sensitive adhesive fibers of the present invention can also be mixed with particulates, such as sorbent particulate material, fumed silica, carbon black, glass beads, glass bubbles, clay particles, metal particles, and the like. Typically, this is done prior to the fibers being collected by entraining particulates or other fibers in an airstream, which is then directed to intersect with the fiber streams. Alternatively, other polymer materials can be simultaneously melt processed with the fibers of the present invention to form webs containing more than one type of melt processed fiber, preferably, melt-blown microfiber. Webs having more than one type of fiber are referred to herein as having commingled constructions. In commingled constructions, the various types of fibers can be intimately mixed forming a substantially uniform cross-section, or they can be in separate layers. The web properties can be varied by the number of different fibers used, the number of layers employed, and the layer arrangement. Other materials, such as surfactants or binders can also be incorporated into the web before, during, or after its collection, such as by the use of a spray jet.

The repositionable sheets described herein above can further include primer layers, low adhesion backsize coatings (also known as release coatings) and other coatings and layers that are known to those skilled in the art. The coating thickness and order of layers are those that would be indicated in a manner consistent with the necessities of manufacture and end-user applications. For example, a typical construction of a stack of notes would include a paper sheet, a primer layer upon which an adhesive strip is coated, and on the backside of the paper in the location consistent with the adhesive strip, there would typically be a layer of low adhesion backsize. Thus in the stack, a single sheet of note paper could be released from the stack without causing additional sheets to be removed, except as provided for in the alternating stack assembly described above.

In the case of a single layer microfiber, the tack of a given pressure-sensitive adhesive can be varied by changing the basis weight (coating weight) of the web. The tack of the overall material can be also modified by appropriate choice of comonomer used during the synthesis of the pressure-sensitive adhesive. The use of tackifier can also be utilized as a variable to change the overall tack/adhesion of the microfibers.

In the case of fibers that have two layers made up of materials that have different levels of tack, the ratio of the materials can control the tack level. The materials can be alternating layers of different pressure-sensitive adhesive materials, or layers of pressure-sensitive adhesive materials alternating with materials that are not pressure-sensitive adhesive materials. Further, each material can be a mixture of pressure-sensitive adhesive materials and/or nonpressure-sensitive adhesive materials.

In the case of fibers that have 3, 5, 7, etc. layers, the presence of a more tacky material as the outside layers will lead to higher tack/peel adhesion values compared to when a less tacky material is on the outside. Again, the ratio of each material can be varied in order to change tack in a controlled fashion. The use of a blend of tacky/non-tacky components within the layers will provide additional fine tuning of the overall tack.

In the case of a single layer fiber, the tack of a given PSA can be varied by changing the basis weight (coating weight ) of the web. The tack of the overall material can also be modified by appropriate choice of comonomer used during the synthesis of the pressure-sensitive adhesive. The use of a tackifier can also be utilized as a variable to change the overall tack/adhesion of the fibers.

EXAMPLES

The following examples are provided to illustrate presently contemplated preferred embodiments, but are not intended to be limiting thereof.

Peel Adhesion to Bond Paper

Peel adhesion is the force required to remove a coated sheet from a bond paper substrate at a specific angle and rate of removal. In the examples this force is expressed in grams per one inch width of coated sheet.

A strip, one inch wide, of coated sheet was applied to the horizontal surface of 9.1 kilogram bond paper (21.8 cm×28.2 cm). A 2.04 kilogram hard rubber roller was used to firmly apply the strip to the bond paper. The free end of the coated sheet was attached to the adhesion tester load cell such that the angle of removal was 90 degrees. The test plate was then clamped in the jaws of the tensile testing machine which is capable of moving the plate away from the load cell at a constant rate of 30.8 centimeters per minute. A load cell reading in grams per inch of coated sheet was recorded. The samples were tested three times. The average value of the three tests is reported.

Peel Adhesion to Fabric

Peel adhesion is the force required to remove a coated sheet from a fabric substrate (very fine single weave fabric (55% polyester/45% wool) Guilford Saxony Flannel/Pindot Pattern 3114, #5) at a specific angle and rate of removal. In the examples this force is expressed in grams per one inch width of coated sheet.

A strip, one inch wide, of coated sheet was applied to the horizontal surface of fabric (21.8 cm.×28.2 cm). A 2.04 kilogram hard rubber roller was used to firmly apply the strip to the fabric. The free end of the coated sheet was attached to the adhesion tester load cell such that the angle of removal was 90 degrees. The test plate was then clamped in the jaws of the tensile testing machine which is capable of moving the plate away from the load cell at a constant rate of 30.8 centimeters per minute. A load cell reading in grams per inch of coated sheet was recorded. The samples were tested three times. The average value of the three tests is reported.

Adhesive Transfer

Adhesive transfer for the purposes of this test is defined as the amount of adhesive that transfer to an applied paper when the coated sample is removed from the paper. It is measured as the percent of the area covered with the adhesive.

A three-quarter inch (1.9 cm) wide strip of adhesive coated sample was adhered to a clean area of a clay coated paper commercially available as KROMEKOTE from Champion Int. Corp., Stamford, Conn., for a few seconds using the mechanical rolling action provided by a release and adhesion tester available from TLMI Inc., Naperville, Ill. The sample was then removed at a ninety degree angle at a constant rate. The clay coated strip was then surveyed by an image processor through a video camera and the percent coverage by adhesive of the viewed area was recorded. Ten fields were surveyed on each test sample and the average of these readings is recorded.

Tackified Polydimethylsiloxane Polyurea Preparation

A tackified polydimethylsiloxane polyurea segmented copolymer was made in the following manner. Dry MQ silicate tackifying resin (available as SR 1000 from General Electric Co., Silicone Resin Division, Waterford, N.Y.) was added at a rate of 58.3 grams/minute (g/min) into zone 1 of a Berstorff 40 millimeter (mm) diameter, 40 L/D (length to diameter ratio), co-rotating, twin screw extruder (available from Berstorff Corp., Charlotte, N.C.). The polydimethoxsiloxane diamine described above ($M_n$ of 69,600) was injected into zone 2 of the extruder at a rate of 58.3 g/min. Methylenedicyclohexylene-4,4'-diisocyanate (available as DESMODUR W from Miles Laboratories, Inc., Pittsburgh, Pa.) was injected into zone 5 of the extruder at a rate of 0.220 g/min. The fully intermeshing screws were rotating at a rate of 300 RPM, and vacuum was pulled on zone 8. The temperature profile of the extruder was: zone 1–25° C.; zone 2–45° C.; zone 3–50° C.; zone 4–45° C.; zone 5–60° C.; zone 6–120° C.; zone 7–160° C.; zones 8 through 10 and endcap 180° C.; and melt pump 190° C. The material was extruded through a strand die, quenched, collected and pelletized.

Example 1

A pressure-sensitive adhesive (PSA) web was prepared using a melt blowing process similar to that described, for example, in Wente, "Superfine Thermoplastic Fibers," in *Industrial Engineering Chemistry, Vol.* 48, pages 1342 et seq (1956) or in Report No. 4364 of the Naval Research Laboratories, published May 25, 1954, entitled "Manufacture of Superfine Organic Fibers" by Wente et al., except that the apparatus was connected to a melt-blowing die having circular smooth surfaces orifices (10/cm) with a 5:1 length to diameter ratio. The feedblock assembly immediately preceding the melt blowing die, which was maintained at 190° C., was fed by stream of KRATON PSA, prepared by mixing 100 parts per hundred parts elastomer (phr) KRATON 1112 (styrene/isoprene/styrene block copolymer from Shell Chemical Co., Houston, Tex.), 80 phr ESCOREZ 1310 (Shell Chemical Co., Houston, Tex.), 10 phr ZONEREZ A25 (Arizona Chemical Co., Panama City, Fla.), 4 phr IRGANOX 1076 antioxidant (available from CIBA-GEIGY Corp., Hawthorne, N.Y.), and 4 phr TINUVIN 328 UV stabilizer (available from CIBA-GEIGY Corp.), at a temperature of 190° C.

A gear pump intermediate of the extruder and the feedblock assembly was adjusted to deliver the KRATON melt stream to the die, which was maintained at 190° C., at a rate of 178 grams/hour/centimeter (g/hr/cm) die width. The primary air was maintained at 190° C. and 138 kilopascals (KPa) with a 0.076 cm gap width, to produce a uniform web. The PSA web was collected on a 1.2 mil (30 µm) biaxially oriented polypropylene (BOPP) film which passed around a rotating drum collector at a collector to die distance of 20.3 cm. The resulting PSA web, comprising PSA microfibers having an average diameter of less than about 25 microns, had a basis weight of 17 grams/square meter ($g/m^2$). The measured adhesive strength can be found in the Table 1.

Example 2

A PSA web was prepared as described in Example 1 except that the basis weight was 55 $g/m^2$.

Example 3

A PSA web was prepared as described in Example 1 except that the basis weight was 5 $g/m^2$.

Example 4

A PSA web was prepared as described in Example 1 except that the basis weight was 1 $g/m^2$.

Example 5

A PSA web was prepared as described in Example 1 except that the apparatus utilized two extruders, each of which were connected to a gear pump which were connected to the feedblock assembly immediately preceding the meltblowing die. The feedblock assembly, which was maintained at 210° C., was fed by two polymer melt streams, one being a stream of KRATON PSA, prepared by mixing 100 phr KRATON 1112, 110 phr ESCOREZ 1310, 10 phr SHELLFLEX Oil 371 (Shell International Petroleum Co., London, England), 4 phr IRGANOX 1076, and 4 phr TINUVIN 328, maintained at a temperature of 172° C. and the other being a melt stream of polypropylene PP 3495-G (available from Exxon Chemical Co. Houston, Tex.) maintained at a temperature of 221° C.

The gear pumps were adjusted so that a 85/15 melt volume ratio of the KRATON PSA to the PP 3495-G was delivered to the die, which was maintained at 210° C., at a rate of 178 g/hr/cm die width. The primary air was maintained at 218° C. and 69 KPa with a 0.076 cm gap width, and the collector to die distance 20.3 cm. The thus produced PSA web, which was collected on a 1.0 mil (25 μm) polyethylene terephthalate film, had a basis weight of 26 g/m².

Example 6

A PSA web was prepared as described in Example 5 except that the feed melt volume ratio of the melt streams was 90/10.

Example 7

A PSA web was prepared as described in Example 5 except that the feed melt volume ratio of the melt streams was 95/5.

Example 8

A PSA web was prepared as described in Example 5 except that the two gear pumps fed a 3-layer feedblock splitter similar to that described in U.S. Pat. Nos. 3,480, 502 (Chisholm et. al.) and 3,487,505 (Schrenk). The primary air was maintained at 116 KPa. The feedblock split the KRATON PSA melt stream, maintained at a temperature of 189° C., and recombined it in an alternating manner with Nylon 3248 (available from Shell Chemical Co., Houston, Tex.) melt stream, maintained at a temperature of 197° C. into a 3-layer melt stream exiting the feedblock, the outermost layers of the exiting stream being the KRATON PSA. The gear pumps were adjusted so that a 75/25 melt volume ratio of the KRATON PSA to the Nylon 3248 (based on a melt volume ratio) was delivered to the die. The PSA web was collected on a 1.2 mil (30 μm) biaxially oriented polypropylene (BOPP) film which passed around a rotating drum collector at a collector to die distance of 25.2 cm. The thus produced PSA web had a basis weight of 38 g/m².

Example 9

A PSA web was prepared as described in Example 8 except that the feed melt volume ratio of the melt streams was 50/50.

Example 10

A PSA web was prepared as described in Example 8 except that the feed melt volume ratio of the melt streams was 25/75.

Example 11

A PSA web was prepared as described in Example 8 except that the Nylon 3248 was replaced with the tackified polydiorganosiloxane polyurea copolymer described above, which was delivered from an extruder maintained at a temperature of 170° C. The gear pumps were adjusted so that a 50/50 melt volume ratio of the KRATON PSA to the tackified polydiorganosiloxane polyurea copolymer was delivered to the die, which was maintained at 210° C, at a rate of 178 g/hr/cm die width and the primary air was maintained at 218° C. and 102 KPa with a 0.076 cm gap width. The thus produced PSA web had a basis weight of 25 g/m².

Example 12

A PSA web was prepared as described in Example 11 except that the feed melt volume ratio of the melt streams was 75/25.

Example 13

A PSA web was prepared as described in Example 11 except that the feed melt volume ratio of the melt streams was 25/75.

Example 14

A PSA web was prepared as described in Example 8 except that the two gear pumps fed a 5-layer feedblock splitter, the KRATON PSA was replaced with an isooctyl acrylate/acrylic acid/styrene macromer (IOA/AA/Sty) terpolymer, the preparation of which is similar to that described in International Publication No. 96/26253 (Dunshee et al.) except that the IOA/AA/Sty ratio was 87/7/6 and the inherent viscosity of the terpolymer was approximately 0.5, and maintained at a temperature of 199° C., and the Nylon 3248 was replaced with a blend composition of 100 phr KRATON 1112 (styrene/isoprene/styrene block copolymer from Shell Chemical Co., Houston, Tex.), 80 phr ESCOREZ 1310 (Shell Chemical Co., Houston, Tex.), 10 phr ZONEREZ A25 (Arizona Chemical Co., Panama City, Fla.), 4 phr IRGANOX 1076, and 4 phr TINUVIN 328, which was delivered from an extruder maintained at a temperature of 180° C. The feedblock split the acrylic terpolymer melt stream and recombined it in an alternating manner with KRATON PSA melt stream into a 5-layer melt stream exiting the feedblock, the outermost layers of the exiting stream being the acrylic terpolymer. The gear pumps were adjusted so that a 50/50 melt volume ratio of the acrylic terpolymer to the KRATON PSA was delivered to the die, which was maintained at 210° C., at a rate of 178 g/hr/cm die width and the primary air was maintained at 218° C. and 116 KPa with a 0.076 cm gap width. The thus produced PSA web had a basis weight of 25 g/m².

Example 15

A PSA web was prepared essentially as described in Example 14 except that the KRATON was replaced with an isooctyl acrylate/acrylic acid/styrene macromer (IOA/AA/Sty) terpolymer, the preparation of which is similar to that described in International Publication No. 96/26253 (Dunshee et al.) except that the IOA/AA/Sty ratio was 92/4/4 and the inherent viscosity of the terpolymer was approximately 0.65.

Example 16

A PSA web was prepared essentially as described in Example 1 except that the KRATON PSA was replaced by KRATON PSA consisting of 100 phr KRATON 1112, 80 phr WINGTACK Plus (Goodyear Chemical Co., Akron, Ohio), 40 phr TUFFLO Oil (Lyondell Lubricants, Houston, Tex.), 4 phr IRGANOX 1076, and 4 phr TINUVIN 328, and the PSA web was collected on a paper substrate. The basis weight was 55 g/m².

Example 17

A PSA web was prepared as described in Example 10 except that the Nylon 3248 was replaced by EASTOFLEX D-127S (a hexene-propylene copolymer from Eastman Chemical Co., Kingsport, Tenn.) and the PSA web was collected on a paper substrate. The basis weight was 65 g/m².

The adhesive properties were measured for the examples and are exhibited in Table 1.

TABLE 1

| Example No. | Peel/Glass 12 grams/cm | Peel/Glass 90 grams/cm | Adh.-Bond grams/cm | Adh.-Fabric grams/cm | Adh. Transfer (Percent) |
|---|---|---|---|---|---|
| 1 | 213.9 | 367.7 | — | — | — |
| 2 | 357.7 | 564.9 | — | — | — |
| 3 | 149.3 | 226.2 | — | — | — |
| 4 | 51.3 | 101.4 | — | — | — |
| 5 | 5.57 | 14.5 | — | — | — |
| 6 | 10.00 | 27.9 | — | — | — |
| 7 | 25.60 | 63.5 | — | — | — |
| 8 | — | 140.4 | — | — | — |
| 9 | — | 29.0 | — | — | — |
| 10 | — | 378.9 | — | — | — |
| 11 | 45.7 | 90.30 | — | — | — |
| 12 | 14.5 | 11.14 | — | — | — |
| 13 | 6.70 | 17.80 | — | — | — |
| 14 | 141.5 | 276.3 | — | — | — |
| 15 | 195.0 | 269.7 | — | — | — |
| 16 | — | — | 74.7 | 4.9 | 1.44 |
| 17 | — | — | 145.7 | 1.0 | 0.07 |

All patents, patent applications, and publications cited herein are each incorporated by reference, as if individually incorporated. The various modifications and alterations of this invention will be apparent to those skilled in the art without departing from the scope and spirit of this invention. This invention should not be restricted to that set forth herein for illustrative purposes.

What is claimed is:

1. A stacked array of repositionable sheets wherein the repositionable sheets comprise a backing and a layer of a repositionable adhesive in the form of a nonwoven web thereon; wherein the nonwoven web comprises at least in part pressure-sensitive adhesive fibers having a pressure-sensitive adhesive composition as a structural component of the fibers.

2. The stacked array of repositionable sheet of claim 1 wherein the backing has a first portion coated with the repositionable adhesive and a second portion substantially free of adhesive on both of its surfaces.

3. The stacked array of repositionable sheet of claim 1 wherein the backing comprises paper.

4. The stacked array of repositionable sheet of claim 3 wherein the backing has a narrow band of the repositionable adhesive coated on one surface along one edge of the backing.

5. The stacked array of repositionable sheet of claim 1 wherein the backing comprises a polymeric film.

6. The stacked array of repositionable sheet of claim 1 wherein the nonwoven web is in the form of a commingled web of two or more types of fibers.

7. The stacked array of repositionable sheet of claim 1 wherein the fibers are multilayer fibers.

8. The stacked array of repositionable sheet of claim 7 wherein each fiber comprises at least a first layer comprising a polymer or copolymer selected from the group of a polyolefin, a vinyl acetate, an acrylate, a tackified natural or synthetic rubber, a polydiorganosiloxane polyurea copolymer, and mixtures thereof.

9. The stacked array of repositionable sheet of claim 8 wherein each fiber further comprises at least a second layer comprising a polymer or copolymer selected from the group of a polystyrene, a polyurethane, a polyester, a polyamide, an epoxy, and mixtures thereof.

10. The stacked array of repositionable sheet of claim 8 wherein each fiber further comprises at least a second layer comprising a polymer or copolymer selected from the group of a polyolefin, a vinyl acetate, an acrylate, a natural or synthetic rubber, a polydiorganosiloxane polyurea copolymer, and mixtures thereof.

11. The stacked array of repositionable sheets of claim wherein the second layer comprises a mixture of one or more polymers or copolymers selected from the group of a polyolefin, a vinyl acetate, an acrylate, a natural or synthetic rubber, a polydiorganosiloxane polyurea copolymer, a polystyrene, a polyurethane, a polyester, a polyamide, an epoxy, and mixtures thereof.

12. The stacked array of repositionable sheet of claim 1 wherein the pressure-sensitive adhesive composition of the fibers comprises an acrylate copolymer comprising copolymerized monomers comprising at least one monofunctional alkyl (meth)acrylate monomer and at least one monofunctional free-radically copolymerizable reinforcing monomer having a homopolymer glass transition temperature higher than that of the alkyl (meth)acrylate monomer.

13. The stacked array of repositionable sheet of claim 12 wherein the pressure-sensitive adhesive composition of the fibers further comprises a tackifier mixed with the acrylate copolymer.

14. The stacked array of repositionable sheet of claim 1 wherein the pressure-sensitive adhesive composition comprises a tackified styrenic block copolymer.

15. The stacked array of repositionable sheet of claim 1 wherein the pressure-sensitive adhesive composition comprises a polydiorganosiloxane polyurea copolymer represented by the repeating unit:

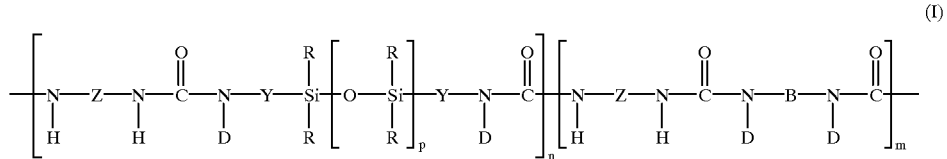

(I)

wherein:

each R is a moiety that independently is:

an alkyl moiety having 1 to 12 carbon atoms optionally substituted with trifluoroalkyl or vinyl groups;

a vinyl moiety or higher alkenyl moiety represented by the formula —$R^2(CH_2)_a CH=CH_2$ wherein $R^2$ is —$(CH_2)_b$— or —$(CH_2)_c CH=CH$— and a is 1, 2, or 3, b is 0, 3, or 6, and c is 3, 4, or 5;

a cycloalkyl moiety having 6 to 12 carbon atoms optionally substituted with alkyl, fluoroalkyl, and vinyl groups;

an aryl moiety having 6 to 20 carbon atoms optionally substituted with alkyl, cycloalkyl, fluoroalkyl and vinyl groups;

a perfluoroalkyl group;

a fluorine-containing group; or a perfluoroether-containing group;

each Z is a polyvalent moiety that is an arylene moiety or an aralkylene moiety having 6 to 20 carbon atoms, or an alkylene or cycloalkylene moiety having 6 to 20 carbon atoms;

each Y is a polyvalent moiety that independently is an alkylene moiety having 1 to 10 carbon atoms, or an aralkylene moiety or an arylene moiety having 6 to 20 carbon atoms;

each D is independently selected from the group of hydrogen, an alkyl moiety of 1 to 10 carbon atoms, phenyl, and a moiety that completes a ring structure including Y to form a heterocycle;

each X is a monovalent moiety which is not reactive under moisture curing or free radical curing conditions and which independently is an alkyl moiety having about 1 to 12 carbon atoms;

B is a polyvalent moiety selected from the group consisting of alkylene, aralkylene, cycloalkylene, phenylene, polyalkylene oxide, including for example, polyethylene oxide, polypropylene oxide, polytetramethylene oxide, and copolymers and mixtures thereof;

m is a number that is 0 to about 100;

n is a number that is equal to or greater than 1; and p is a number that is about 5 or larger.

* * * * *

UNITED STATES PATENT AND TRADEMARK OFFICE
CERTIFICATE OF CORRECTION

PATENT NO. : 6,107,222
DATED : August 22, 2000
INVENTOR(S) : Joseph, Eugene G.

It is certified that error appears in the above-identified patent and that said Letters Patent is hereby corrected as shown below:

Column 4,
Line 53, delete "Theological" and insert in place thereof -- rheological --.

Column 7,
Line 43, delete "isobomyl" and insert in place thereof -- isobornyl --.

Column 8,
Line 36, delete "examples" and insert in place thereof -- example of --.
Line 53, delete "--$\{C(R^3)R^4)-CH_2\}_n-R^5$" and insert in place thereof
-- --$\{C(R^3)(R^4)-CH_2\}_n-R^5$ --.

Column 10,
Line 45, delete "-- $R^2(CH_2)_nCH=CH_2$" and insert in place thereof
-- --$R^2(CH_2)_aCH=CH_2$ --.
Line 46, delete "--$(CH_2)_nCH=CH$--" and insert in place thereof -- --$(CH_2)_cCH=CH$ -- --.

Column 13,
Line 30, delete "Q)audt" and insert in place thereof -- (Daudt) --.
Line 31, delete "Grady)," and insert in place thereof -- Brady), --.

Column 16,
Line 67, delete "weight" and insert in place thereof -- weight) --.

Column 17,
Line 1, delete ")" preceding "of".

Column 22,
Line 30, insert -- 8 -- following "claim".

UNITED STATES PATENT AND TRADEMARK OFFICE
CERTIFICATE OF CORRECTION

PATENT NO.    : 6,107,222
DATED         : August 22, 2000
INVENTOR(S)   : Joseph, Eugene G.

It is certified that error appears in the above-identified patent and that said Letters Patent is hereby corrected as shown below:

<u>Column 23,</u>
Line 8, delete "6,and" and insert in place thereof -- 6, and --.

Signed and Sealed this

Fourth Day of February, 2003

JAMES E. ROGAN
*Director of the United States Patent and Trademark Office*